United States Patent [19]

Kaywood et al.

[11] Patent Number: 5,729,899
[45] Date of Patent: Mar. 24, 1998

[54] CAMSHAFT ASSEMBLY AND METHOD OF MAKING SAME

[75] Inventors: Bryan R. Kaywood, Stockbridge; Kenneth D. Scholl, Parma, both of Mich.

[73] Assignee: Kaywood Products Corporation, Jackson, Mich.

[21] Appl. No.: 727,907

[22] Filed: Oct. 9, 1996

[51] Int. Cl.$^6$ ............................. B23P 15/00; F16H 53/00
[52] U.S. Cl. ............................. 29/888.1; 29/523; 29/525
[58] Field of Search ............................. 29/888.1, 523, 29/525; 74/567; 123/90.6

[56] References Cited

U.S. PATENT DOCUMENTS

| | | | |
|---|---|---|---|
| 4,597,365 | 7/1986 | Madaffer | 123/90.6 |
| 4,835,832 | 6/1989 | Arnold et al. | 29/523 |
| 5,205,187 | 4/1993 | Ebbinghaus | 29/888.1 |
| 5,263,249 | 11/1993 | Kaywood | 29/888.1 |
| 5,428,894 | 7/1995 | Orsini, Jr. | 29/888.1 |
| 5,664,463 | 9/1997 | Amborn et al. | 29/523 |

FOREIGN PATENT DOCUMENTS

| | | | |
|---|---|---|---|
| 4306621 | 9/1994 | Germany | 29/888.1 |
| 60-70108 | 4/1985 | Japan | 29/888.1 |

*Primary Examiner*—Weilun Lo
*Attorney, Agent, or Firm*—Barnes, Kisselle, Raisch, Choate, Whittemore & Hulbert

[57] ABSTRACT

A lightweight composite tubular camshaft having an array of cams positioned therealong and method of making same wherein an array of blind predrilled holes into an outer surface of a hollow camshaft tube keyway. Each cam has a keyway groove opening to one side of, and to the inner surface of, a cam through-bore preformed for mounting close fitting on the tube at a preselected tube hole cam location to provide a desired angular orientation timing of the cams upon assembly on the tube. One end of a timing pin key is inserted in each blind hole and the opposite pin end protrudes therefrom. Each cam is slid into its axial location with its groove engaging the pin protruding end to locate the cam in its desired angular orientation. The cams are then permanently locked in position by permanent deformation expansion of the tube into interference engagement with the respective cams. Preferably, both the tube and cam keyways as well as key pin are cylindrical, and the key is a hollow resilient sheet metal split sleeve. The key pin sleeve is circumferentially compressed to fit one end of the key pin in the camshaft tube keyway hole and is self-retaining therein.

21 Claims, 1 Drawing Sheet

CAMSHAFT ASSEMBLY AND METHOD OF MAKING SAME

FIELD OF THE INVENTION

This invention relates to camshafts, and more particularly, to a hollow camshaft assembly for valve actuating gear of an internal combustion engine and a method of making the same.

BACKGROUND OF THE INVENTION

It is well known in the art to provide various forms of assembled or composite camshafts for actuating the valve gear of an internal combustion engine in which the composite camshaft is assembled from individual elements, such as cams and journals mounted on a hollow tube and secured thereto by mechanically expanding the hollow shaft with a ball or mandrel. Methods of making such camshafts on a high production basis with assembly fixtures are disclosed, for example, in U.S. Pat. Nos. 4,597,365 and 4,835,832.

U.S. Pat. No. 5,263,249 discloses an alternative assembly method which avoids the need for expensive fixtures of the aforementioned mentioned patents, which may also be used for mass production assembly, but is particularly suitable for smaller volumes where the provision of more complicated fixtures is not economical and for the economical development of new or modified camshaft designs to be assembled for testing and development. In the '249 patent, in lieu of the precision assembly fixture, a cam timing orientation procedure is employed wherein steel bearing balls with a diameter of 1/8" are embedded in undersized premachined shallow blind holes in the camshaft tube, and pregrooved cam and journal elements are sleeved in sequence on the tube to register the cam element groove with the associated protruding bearing balls to set the angular orientation of the cam shaft.

In addition, in the '249 patent procedure C-shaped spacer gauge elements are utilized which are slid transversely over the tube between each adjacent pair of cam elements to properly control the longitudinal spacing and axial position of the cam elements on the shaft. The camshaft tube is preferably positioned vertically for this step, and each of the bearing balls must be held in place while its associated cam element is slid onto the tube and its groove engaged with the associated bearing ball. The bearing ball is made slightly oversize relative to the hemispherical ball pocket in the shaft and to the quarter spherical cavity shaped groove in the cam element so that as the cam element is forced against the associated spacer gauge, the bearing ball engages the edges of both the shaft pocket and cam element groove and deforms them slightly upon assembly. This is intended to position the cam element groove in alignment with the shaft pocket to accurately index the cam element angularly on the camshaft tube. When all of the cam elements as well as shaft journal elements have been assembled sequentially on the tube with the cams angularly positioned in the aforementioned manner, and while the spacer gauges remain located between these elements for longitudinal positioning, the assembly is transferred to a simple fixture for the tube expansion step. Tube expansion is preferably accomplished in the manner described in U.S. Pat. No. 4,835,832 wherein the shaft is trapped or loaded to prevent axial lengthening during mechanical ballizing to cause tube expansion for mechanically locking the components together.

One problem with the aforementioned prior an camshaft construction and assembly of the '249 patent is that the locating keys are in the form of tiny, spherical bearing bails which must be individually placed in their associated shaft pocket and held in the place until the associated cam element is registered with this bearing ball key. Since the bearing ball is oversize relative to its hemispherical shaft pocket the ball is neither serf-retaining nor stable when seated on the pocket. Hence each ball must be held in position until captured by the associated cam element groove pocket. Destabilizing gravitational effects thus must be taken into account and the shaft orientation accommodated to this condition to help prevent fall off of the balls during the cam installation assembly steps. Since the keying elements are precision bearing balls, they are typically only readily commercially available in the form of precision diameter spheres with hardened surfaces or hardened throughout in order to properly serve their normal function as bearing bails operating between ball bearing races. Hence, the interference fit necessarily relies on deformation of the softer material forming pockets in the camshaft and cam element, rather than deformation of the bearing ball itself. Because the key way shape and location in both the shaft and cam element are the primary parameters that control accuracy of angular orientation of the cam element on the shaft, deformation of either or both of these keyways can result in loss of precision in this desired angular orientation.

Moreover, the hemispherical and quarter spherical shape of the shaft and cam pockets respectively requires precise machining of a relatively costly nature. Although the provision of such a key in a keyway helps angularly lock each cam element on the camshaft, and thus helps reduce the amount of mechanical shaft cold work expansion required during the ballizing operation, the spherical geometry of the keyway and key is inherently limited in its torque transferring capability for holding the cam angularly in position on the shaft against cam-follower-induced torsional stresses developed between the camshaft and the shaft when in use in the engine.

OBJECTS OF THE INVENTION

Accordingly, objects of the present invention are to provide improved camshaft structures and assembly methods wherein lightweight camshaft assemblies may be made using previously known tube expansion methods and in which the camshaft and cam elements are provided with preformed keyways so that, as in the aforementioned '249 patent, the need for expensive precision gauges and fixtures is eliminated, but wherein the aforementioned problems associated with the construction and method of the '249 patent are overcome in an improved and more economical manner, and in which greater precision and torque transmission capability is achieved in the angular locating and positioning of the cam elements on the camshaft while reducing the manufacturing cost of both the keyways and key employed in the construction of the cam elements and camshaft.

SUMMARY OF THE INVENTION

In general, and by way of summary description and not by way of limitation, the invention accomplishes the aforementioned objects by providing both the keyway and key in cylindrical form rather than spherical, and utilizing a readily deformable key in the form of a roll pin or the like, preferably made as a hollow resilient sheet metal sleeve having a parting gap extending throughout its axial length to render the sleeve circumferentially compressible. The sleeve is diametrically oversize in its free state condition and is inserted endwise axially into a shaft cylindrical keyway pocket while circumferentially compressed to ensmall its outside diameter. Due to this yieldable, resilient interference fit of the key pin in the shaft pocket, the pin is self-retaining on the shaft and hence need not be held in place prior to or during sliding of the cam element into registry with the key pin. The cam element keyway is semi-cylindrical and also diametrically undersized relative to the pin diameter. Hence an interference fit is likewise obtained between the key pin and cam element keyway by circumferential yieldable compression of the key pin by the cam element pocket during axial movement of the cam element to its final longitudinal position on the camshaft.

Due to the yieldable nature of the key pin, assembly forces are reduced without loss of accurate retention of the cam elements on the camshaft as the same are being sequentially individually assembled ready for the tube expansion step. During the tube expansion step, the compressibility and deformability of the sheet metal roll pins, enables the same to be cold worked as the tube is likewise cold worked by ballizing into axial and circumferential locking engagement with the associated cam elements keyed thereon. The resultant axial compression of the roll pin during the ballizing procedure further increases the interference fit forces between each key and keyway and further rigidizes the keyed connection between the cam element and the shaft. Due to the cylinder geometry of the keyways and key pin and their co-axial registry perpendicular to the camshaft axis, greater structural strength is provided to resist opposed torsional stresses imposed upon the cam elements and camshaft, providing greater cam retention reliability in engine use, requiring less mechanical expansion of the camshaft during the ballizing procedure and enabling the cam element bores to be formed circular instead of in the more expensive non-circular shapes of the aforementioned U.S. Pat. No. 4,597,365 and 4,835,832.

BRIEF DESCRIPTION OF THE DRAWINGS

The foregoing as well as other objects, features and advantages of the present invention will become apparent from the following detailed description of a preferred embodiment of the best mode presently known of making and using the invention, the appended claims and accompanying drawings in which:

DETAILED DESCRIPTION OF PREFERRED EMBODIMENT

Figure 2:
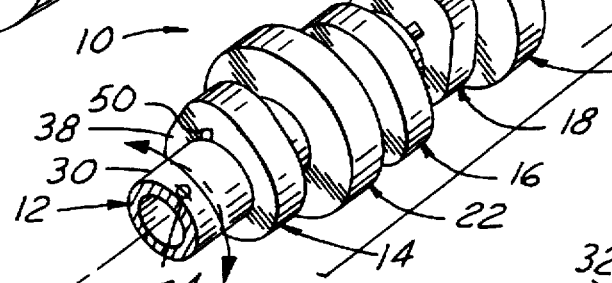
FIG. 2 is a diagrammatic and fragmentary perspective view illustrating a subsequent step in the assembly method of the invention.

Referring now in more detail to the drawings, FIG. 2 illustrates a portion of a partially assembled composite camshaft 10 being constructed in accordance with the method of the invention. Upon completion, the camshaft may be generally of the type shown in the above-noted U.S. Pat. Nos. 4,597,365; 4,835, 832 and 5,263,249, which are incorporated herein by reference. Thus camshaft 10 includes a hollow supporting shaft or tube 12 on which is mounted a number of cam elements or cams 14, 16, 18 and 20 (cam 20 being shown separated and ready to be installed on tube 12), and journal elements 22 and 24. Cams 14–20 and journals 22, 24 may be solid elements formed in the manner disclosed in the aforementioned '365 and/or '832 patents, or may be lightweight elements constructed as disclosed in the '249 patent.

As a preliminary step in the method of the invention, each of the cams 14–20 are provided with a through bore 26 sized for a close sliding fit over the cylindrical exterior surface 30 of tube 12. Although cam bore 26 may be formed with a special, non-circular shape as disclosed in the above noted '832 patent, in many applications a simple cylindrical bore shape suffices due to the rotational locking strength provided by the improved roll pin key and keyway feature of the present invention, thereby avoiding the extra expense of providing a special non-circular shape in bore 26.

Figure 3:
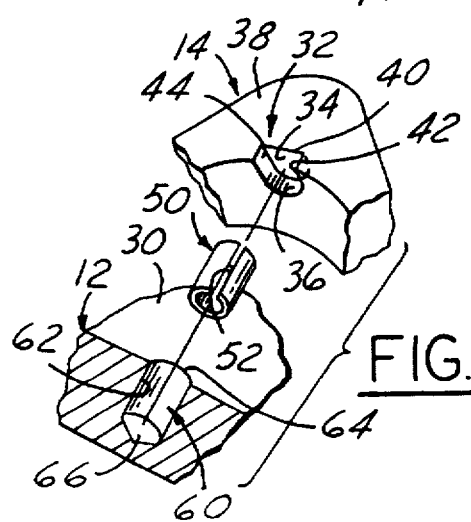
FIG. 3 is a fragmentary exploded perspective view of the roll pin key of the invention and associated portions of the camshaft and cam element.
Figure 4:
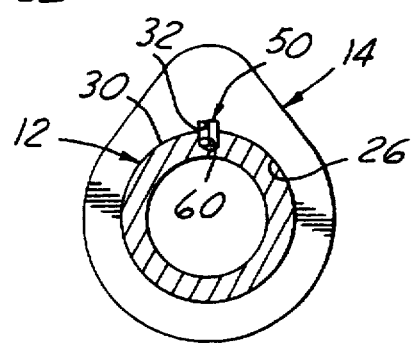
FIG. 4 is a center sectional view one of the cam elements, roll pin key and camshaft in assembly taken radially of the camshaft axis.

In accordance with one feature of the present invention, each cam 14–20 is provided with a specially formed keyway 32, as best seen in FIG. 3. Preferably keyway 32 has a flat end wall 34 oriented in a plane perpendicular to the radius of bore 26 and a partially curved sidewall 36. End wall 34 and side wall 36 open at the solid side wall face 38 of cam 14 at edges 40, 42 and 44, as shown in FIG. 3. The back or root surface of side wall 36 has a constant radius of curvature formed to a predetermined diametrical dimension. This curvature extends through at least 180° of circumference of wall 36 and then the remaining mutually opposed surfaces of the side wall extend parallel to one another and perpendicular to cam face 38 to their respective intersections with edges 42 and 44. Alternatively, the root curvature of wall 36 may continue for slightly more than 180° and then extend with straight opposed walls out to edges 42 and 44 so that the spacing between edges 42 and 44 is slightly less than the diameter of the root of wall 36. As will be readily understood by those of ordinary skill in the art, keyway 32 may be readily formed to this key hole geometry by suitable milling and/or spot face drilling tools. Each keyway groove 32 must be formed in a known angular location relative to the cam form, and may, for convenience, be centered on the longest diameter of the cam passing through the high point of tip of the cam nose of the raised lobe of the cam. Extreme accuracy may be obtained, for example, by forming the periphery of the cam lobe and so locating the timing groove keyway 32 in the same machining operation.

In accordance with a principal feature of the present invention, the timing key for angularly locating each cam on camshaft 12 is in the form of a cylindrical pin 50, preferably in the form of a hollow tubular sheet metal roll pin having a parting gap 52 extending end-to-end axially of the sleeve. The free state outside diameter of pin 50 is made slightly larger than the root diameter of wall 36, and the outside diameter of pin 50 when circumferentially compressed to fully close parting gap 52 is made slightly smaller than that of wall 36. The material of pin 50 may be high carbon, heat treated steel, and its wall thickness thin enough to impart sufficient resilience to pin 50 to enable parting gap 52 to be closed by finger pressure squeezing the pin to its minimum diameter. Pin 52 should have sufficient resilience to return to its initial free state diameter upon release of such squeeze pressure. The axial dimension of pin 50 is also controlled to fairly precise limits as set forth in more detail hereinafter.

In accordance with a further feature of the invention, a camshaft keyway 60 is provided in the provided in the form of a blind hole having a cylindrical side wall 62 of predetermined constant diameter intersecting the outer surface 30 of camshaft 12 at a circular edge opening 64 and terminating at a junction with the conical blind end wall 66 of the hole as may be formed by a drill point used in drilling hole 60. The axis of hole 60 is coincident with a radius shaft of 12. The combined axial depths of cam keyway 32 and shaft keyway 60 in assembly is slightly greater than the axial dimension of pin 50.

Figure 1:
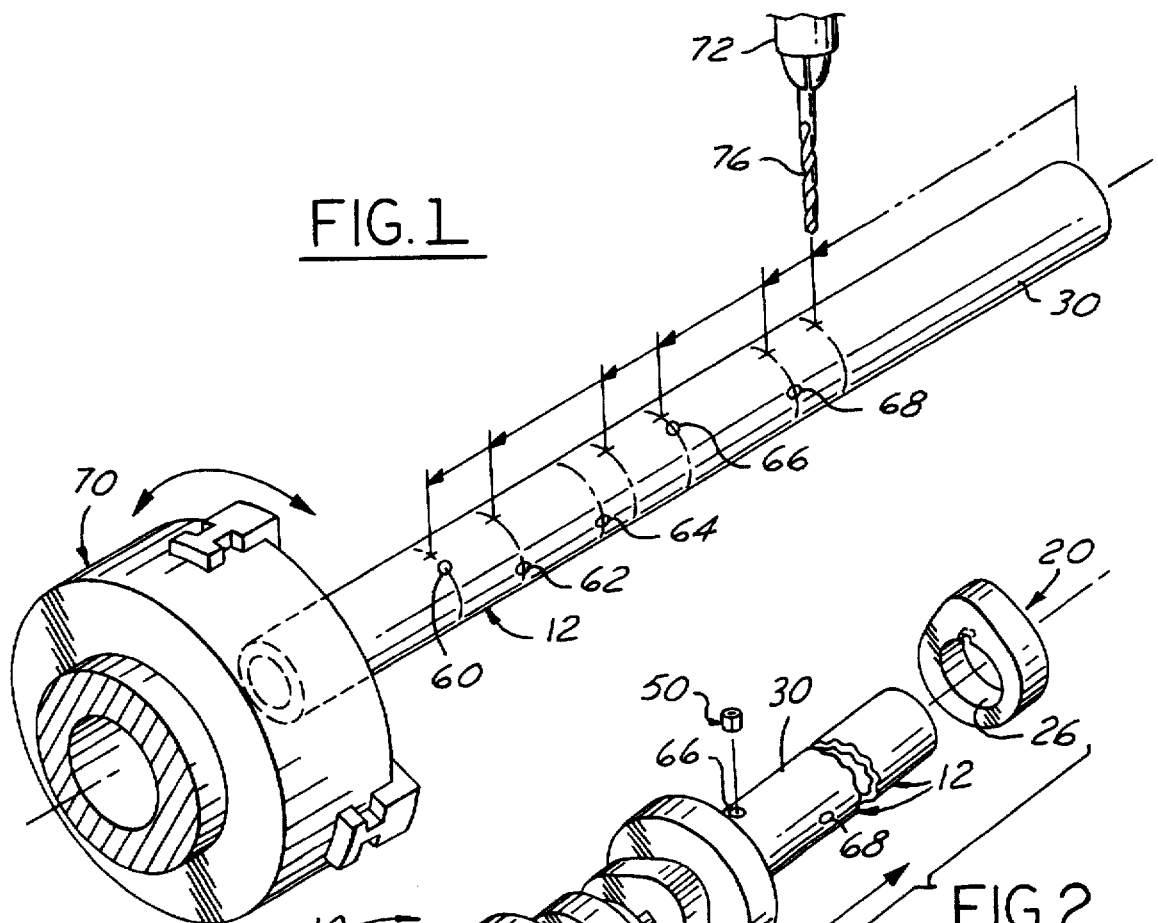
FIG. 1 is a diagrammatic perspective view of one step in the method of making a composite camshaft assembly in accordance with the present invention

As best seen in FIG. 1, in accordance with a further step of the method of the invention, tubular camshaft 12 is pre-drilled to form an array of keyway blind holds 60, 62, 64, 66, 68, etc., each geometrically and dimensional identical with keyway 60, but ganged in a predetermined pattern axially and circumferentially of shaft 12. This shaft pre-drilling operation is diagrammatically illustrated in FIG. 1 and begins with the mounting of tubular shaft 12 in the rotatable head or chuck 70 of a suitable indexing machine, such as a four axis computer numerically controlled (CNC) mill also provided with a drill head 72 as shown in FIG. 1. Tube 12 is thus automatically sequentially rotationally indexed, and either the drill head or the tube is advanced in the direction of the axis of the tube through the proper positions at which cams 14–20 are to be axially and angularly located relative to one another and to a reference hole 74 provided at one end of camshaft 12 (FIG. 2). The blind cylindrical keyway holes 60–68 are thus sequentially drilled at a precisely controlled point at each predetermined location by the drill bit 76 of drill head 72.

After the foregoing steps of preparing camshaft 12 cams 14–20, as well as providing journals 22, 24 and any other like elements to be arranged in assembly on the camshaft, such elements are assembled in sequence on camshaft 12 as indicated in FIG. 2. Tube 12 may be positioned vertically, horizontally or in some other orientation for this step, as desired. Assembly may be facilitated by stringing the elements slidably for free rotation on a feeder tube (as shown) to thereby maintain the loose elements generally in coaxial alignment and strong in proper sequence axially along the feeder tube, and with one end of the feeder tube end abutted to the right hand end of shaft 12 (as viewed in FIGS. 1 and 2).

Prior to sequential assembly of each cam element 14–20 onto shaft 12, a pin 50 is fixed into that one of the blind indexing holes 60–68 that is to be registered with that cam element. This is done by circumferentially compressing the pin to ensmall it sufficiently to slip fit the pin one-end-first into camshaft keyway hole 60 until the pin bottoms in the hole. Upon release of squeeze pressure on the pin, the same resiliently expands to thereupon frictionally grip the side wall of hole and thus securely yet removably retain pin on camshaft 12 regardless of the gravitational orientation of the shaft relative to the pin. Pin 50 is thus self-retaining on the camshaft and need not be held in place while the associated cam element, such as cam 14, is slipped onto tube 12 and moved therealong until its leading face 38 abuts the protruding end of pin 50. The cam element may then be rotated on shaft 12, or shaft 12 rotated while the cam element is held stationary, until pin 50 angularly registers with cam keyway 32. Then slight further push-on force exerted on cam 14 will slide the protruding end of pin 50 into cam keyway 32 until the root surface of keyway wall 36 abuts the side of the pin facing the same. Some resistance to this axial push-on motion of the cam relative to the pin is caused by the interference fit of the resiliently expanded pin relative to the keyway entrance dimension as defined by edges 42 and 44. As these edges engage the cylindrical contour of the pin surface they will tend to cam-squeeze the pin protrusion to thereby partially close the parting gap 52 and develop spring stress on the pin so that it now also yieldably frictionally engages the keyway side wall 36. This yieldable interference fit of pin 50 into keyway 32 thus accurately angular orients cam 14 as desired on camshaft 12 relative to the reference location 74. At the same time the abutment of the pin with the root of side wall 36 sets the axial location of cam 14 along shaft 12. The frictional grip of the pin in cam keyway 32 is sufficient to hold the cam on the pin despite any adverse orientation of the cam and camshaft wherein gravitational force is tending to disengage the cam with the pin.

Preferably, the curved side wall 36 of keyway 32 subtends approximately 190° to further assist this axial cam retention on pin 50, the remaining opposed entrance surfaces of wall 36 extending parallel out to edges 42 and 44. Preferably, the distance from the root apex of wall 36 to leading face 38 of cam 14 is equal to or slightly greater than the diameter of pin 50 so that it is recessed flush with or inset slightly from face 38 in the fully installed position of the cam on the pin. Thus, it will be seen that cross sectional configuration of keyway 32 in the plane perpendicular to the radius of cam bore 26 is preferably slightly keyhole shaped.

It also will be noted that the interference fit between the free state diameter of pin 50 and the inside diameter of cam keyway 32 and camshaft keyway 60 is accommodated by the resilient yielding of roll pin 50 rather than by the prior art permanent deformation of the keyway surfaces. Hence, no tolerance variation or deviation are introduced by any such keyway deformation when either inserting the pin in the camshaft or slip firing the cam onto the protruding pin head. Nevertheless, these precision made cam and camshaft keyways are accurately and reliably positioned and maintained in coaxial alignment with one another by pin 50 to thereby accurately index the cam angularly on the camshaft.

Journals 16 and 24 have concentric through-bores and peripheries and hence do not require angular positioning relative to camshaft 12, and hence do not require location by keying to shaft 12. Nevertheless, these elements may be similarly formed for roll pin keying in like manner to the cam elements, if desired. Otherwise, the axial location and spacing of the array of cam elements and journals on the camshaft can be achieved in the assembly step by applying the C-shape spacers 58 as disclosed in U.S. Pat. No. 5,263, 249. These spacers each have a slot 59 so that they can be slid over shaft 12 between each adjacent pair of elements 14, 22, etc., serve as assembly gauges to proper control longitudinal spacing and axial positioning of the elements relative to one another and along shaft 12. However, if key pins of the invention are also provided for the journal elements, the keys will perform the axial locating function on the tube and the use of such spacers thereby eliminated.

When all of the cams 14–20 and journals 16, 18, etc. have been assembled sequentially on tube 12, with each of such elements fully seated and held by its roll pin key 50, this assembly can be handled, stored, transported, etc. without thereby loosening or changing the assembled accurately oriented relationship of the elements on the camshaft 12 so that the same is ready for transfer to and mounting in a simple prior art fixture (not shown) for the tube expansion step. However, now this fixture may be oriented in any orientation desired when all of the elements are key pin retained on the camshaft. On the other hand, if the aforementioned gauge spacers 58 are still being employed for non-keyed elements, then the camshaft should be oriented horizontally with the slots 59 of spacers 58 facing downwardly to preserve gravity retention of the spacers on the tube.

Tube expansion is preferably accomplished in essentially the manner described in the aforesaid U.S. Pat. No. 4,835, 832, although other methods of tube expansion may be utilized. However, like the method in the '249 patent, the fixture of the '832 patent may be simplified since it does not need to locate the cams (as this has been done by the locating roll pins 50) and needs only to restrain the camshaft from bending, such as restraining the journal elements 16, 24 against lateral motion. As in the '249 patent, keying the cam elements during initial assembly thereof on the camshaft avoids the need for expensive precision assembly fixtures to be provided for production of each new camshaft assembly design, and greatly increases the speed, accuracy and economy with which a new or modified camshaft design may be assembled for testing and development. Moreover, the method of the invention is also well adapted for economical use in mass production camshaft assembly because of the ease of feeding and installing the key pins into the camshaft and the snap fit retention of the cams to the protruding pin heads.

After the cam elements and journals are firmly affixed to camshaft 12 by the mechanical ballizing expansion process, wherein cold working and expanding of the tube wall diametrically is performed, the assembled composite camshaft may then be finished by final machining of the cams, journals and other elements as required in accordance with ordinary camshaft machining procedures. In this regard, the enhanced precision angular location of the cam elements on the camshaft made possible by the precision achieved in location by roll pin keys 50 minimizes these final machining requirements for the assembled camshaft.

In accordance with a further feature of the invention, during the tube expansion ballizing process, the radial expansion of the tube wall as the ball axially passes by the location of each roll pin key 50 in the assembly will tend to move the blind end wall 66 of keyway 60 axially toward the axially aligned opposed wall 34 of the cam keyway 32. Assuming an initial tight endwise fit of pin 50 in aligned keyways 32 and 60 as captured in the assembly step of FIG. 2, prior to ballizing, this axial shortening of the conjoint keyway will axially deform pin 50 and thus cold work it into further tighter engagement first with the keyway end walls and then side walls due to pin bulging, the ballizing process thereby tending to transform the initial spring sleeve nature of pin into a rigid locking key captured in the cold worked keyway of the cam and camshaft. Due to this further lockup of the key cold worked sleeve in the keyway, again achieved without angularly shifting or deforming cam and camshaft keyway walls relative to one another, thus provide a more secure and accurate retention of each cam on the camshaft.

From the foregoing it now will be apparent to those skilled in the art that the present invention provides an improved composite camshaft assembly and method of the making which amply fulfills the aforestated objects and provides many advantages over the prior art. Substitution of the initially resilient split sleeve roll pin for use as the keying element in place of the hardened steel bearing ball of the '249 patent offers many advantages in terms ease of feeding and handling of the roll pin as compared to the tiny bearing balls as well as economy in part cost. The spring clip nature of the roll pin enables the same to be easily circumferentially compressed and inserted into the blind keyway holes of the camshaft, and once inserted and released the roll pin frictionally expands to be self-retaining therein regardless of adverse gravitational effects. Likewise, the squeezing of the roll pin that occurs during axial push on of the cam element generally circumferentially yieldably compresses the resilient roll pin key and hence does not deform either the key or cam keyway. Hence ultra-precision coaxial alignment of the cam and shaft keyways is achieved in a simple and reliable manner. Once the cam and journal elements are initially key retained by spring stress friction forces on the camshaft, the pre-assembly is secure enough to be handled, stored, inventoried and subsequently fixtured in the ballizing machine without risk of loss of cam and journal angular and axial positional accuracy on the camshaft.

After ballizing and finishing of the composite camshaft assembly, and when engine-installed for use in operating the valve actuating gear of the engine, the tightly fitted and in-situ cold worked roll pins provide a very strong torque transmitting permanent connection between each cam element and the camshaft. Due to the cylindrical geometry of the roll pin and its associated keyways, with the same aligned co-axially along a radius of the camshaft, and the subsequent axial extent of protrusion of half of the roll pin into each of the aligned keyways, a very strong mechanical keyway interconnection is obtained that is able to reliably withstand the high peak and oppositely acting shear stresses repetitively imposed differentially in these elements during engine operation. Moreover, due to this higher strength keying feature, the through bores 26 of the cam elements may be circular, rather than non-circular as in the prior art, and thus have a less costly geometrical configuration for manufacture by machining. Likewise, the extent of cold working expansion to achieve permanent deformation diametrically of the hollow camshaft 12 as imparted during the ballizing process may be reduced without diminishing torque stress transfer capability of the cams on the camshaft because of the in-situ bulging and permanent fixing of the roll pin in their keyways, and due to their high strength to-weight ratio in resisting transverse shearing loads in their axial keying orientation in the cam and camshaft.

We claim:

1. A method of making a composite camshaft having an array of cams positioned therealong comprising the steps of
   (a) machining a blind hole into an outer surface of a hollow tube with a predetermined external diameter at each of a plurality of preselected axial cam locations,
   (b) providing a groove opening to one side of, and to the inner surface of a through bore, of each of the cams as preformed for mounting with their bores close fitting on the tube, one at each of an associated one of said preselected cam locations, the cam grooves and the respective associated tube holes being located to provide a desired angular orientation timing of the cams upon assembly on the tube,
   (c) seating and friction fit retaining one end of a timing pin in each of the blind holes with the opposite pin end protruding therefrom, next aligning the groove of each cam with the pin at its corresponding location, and then sliding each cam into its axial location with its groove engaging the protruding end of the pin seated in the respective blind hole to locate the cam in its desired angular orientation to thereby initially assemble and temporarily hold the cams on the tube at their preselected axial location and in their desired angular orientations, and
   (d) locking the cams permanently in position by permanent deformation expansion of the tube into interference engagement with the respective cams.

2. The method of claim 1 comprising the further steps of forming the diameters of the blind holes and the grooves slightly smaller than that of the pins such that the pins securely engage the edges of their associated blind hole and groove both during the pin-to-tube and pin-to-cam assembly steps.

3. The method of claim 1 wherein the pins are made to be circumferentially compressible and the tube holes and cam grooves are sized to slightly circumferentially compress the pin during the cam assembly step and axially compress the pin during the tube expansion steps.

4. The method of claim 1 wherein the tube expansion step is performed by mechanical means during which the cam spacing is maintained by the pins disposed in engagement with adjacent cams mounted on the tube.

5. The method of claim 4 wherein the step of initially temporarily assembling the cams on the tube is performed by sequential assembly of the individual cams using the associated pins to engage each associated, cam to axially sequentially locate the cams upon assembly.

6. The method of claim 1 wherein the cams are initially formed by one of the methods of mass production forming including cold, warm and hot forming from slugs and powder metal compaction and sheet metal forming including stamping and roll forming, and the pins are formed by one of the methods of mass production making of a hollow sleeve split lengthwise to form a parting gap and thereby made resiliently circumferentially compressible for reducing the sleeve diameter to tube hole and cam groove diameter.

7. The method of claim 6 wherein the grooves are formed in the cam bores during the initial forming of the cams.

8. The method set forth in claim 7 wherein the cam grooves have a keyhole-like configuration in a plane extending both parallel to the tube axis and perpendicular to a tube radius.

9. The method of claim 1 wherein said through-bores of the cam elements are circular to provide, after expansion of the tube, a high torque capability of the mechanical engagement between the tube and cam elements due to the keying interengagement thereof provided by the pins.

10. The method of claim 5 wherein said pins are heat treated for high strength and resilience.

11. The method of claim 1 wherein said grooves of the cam elements and the associated tube holes have a combined axial length only slightly more than the axial length of the pin inserted therein such that the pin is axially compressed during expansion of the tube to thereby provide a high torque capability and secure mechanical engagement between the tube, cam elements and pins.

12. The method of claim 1 wherein the tube holes and cam grooves are sized to slightly circumferentially compress the pin during the cam assembly step.

13. The method of claim 12 wherein the tube expansion step is performed by mechanical means during which the cam spacing is maintained by the pins disposed in engagement with adjacent cams mounted on the tube.

14. The method of claim 13 wherein the step of initially temporarily assembling the cams on the tube is performed by sequential assembly of the individual cams using the associated pins to engage each associated cam to axially sequentially locate the cams upon assembly.

15. The method of claim 14 wherein the cams are initially formed by one of the methods of mass production forming including cold, warm and hot forming from slugs and powder metal compaction and sheet metal forming including stamping and roll forming, and the pins are formed by one of the methods of mass production making of a hollow sleeve split lengthwise to form a parting gap and thereby made resiliently compressible for reducing the sleeve diameter to tube hole and cam groove diameter.

16. The method of claim 15 wherein the grooves are formed in the cam bores during the initial forming of the cams.

17. The method set forth in claim 16 wherein the cam grooves have a keyhole-like configuration in a plane extending both parallel to the tube axis and perpendicular to a tube radius.

18. The method of claim 17 wherein the cross-section of the tube and the through bore openings of the cam elements are circular to provide, after expansion of the tube, a high torque capability of the mechanical engagement between the tube and cam elements due to the keying interengagement thereof provided primarily by the pins.

19. The method of claim 18 wherein said pins are heat treated for high strength and resilience.

20. The method of claim 19 wherein said grooves of the cam elements and the associated tube holes have a combined axial length only slightly more than the axial length of the associated pin inserted therein such that the pin is cold-work deformed by being axially compressed during expansion of the tube to thereby provide a high torque capability and secure mechanical engagement between the tube, cam elements and pins.

21. In a method of manufacturing a camshaft assembly for internal combustion engines, said method including the steps of:

(a) providing a plurality of cam and journal elements, (b) said elements each including an axial openings, (c) inserting a hollow tube, into said elements, in close fitting relation with said openings, (d) securing said elements in predetermined fixed angular orientations and spacings with said openings aligned on a common axis with the tube by individually inserting a plurality of key elements one each into each pair of associated registered openings in the tube and each element, and (e) expanding the hollow tube into mechanical interference engagement with all the element openings to secure the elements permanently onto the tube in said predetermined orientation by expanding the tube inner diameter to outwardly deform the tube wall in the required degree the improvement characterized by the further steps of;

(f) forming each key element as an axially elongated member of material permanently axially deformable by cold-work axial compression of the member, and (g) providing the registered openings as a socket in each element and an associated socket in the tube with the element and tube sockets axially aligned when registered with an associated one of the key elements inserted therein in step (d), and with the key element closely fitting axially endwise into the sockets at the completion of step (d), such that the key element is axially compressed and cold work deformed during the expanding of the hollow tube in step (e).

* * * * *

UNITED STATES PATENT AND TRADEMARK OFFICE
CERTIFICATE OF CORRECTION

PATENT NO.   : 5,729,899
DATED        : March 24, 1998
INVENTOR(S)  : Bryan R. Kaywood/Kenneth D. Scholl It is certified that error appears in the above-indentified patent and that said Letters Patent is hereby corrected as shown below:

Col 4, Line 10, change "a through bore 26" to "an axially opening through bore 26".

Col 10, Line 31, change "openings" to "opening".

Signed and Sealed this

Fifteenth Day of December, 1998

Attest:

BRUCE LEHMAN

*Attesting Officer*       *Commissioner of Patents and Trademarks*